(12) United States Patent
Cheng et al.

(10) Patent No.: US 12,346,576 B2
(45) Date of Patent: Jul. 1, 2025

(54) MEMORY SYSTEMS AND OPERATION METHODS THEREOF

(71) Applicant: Yangtze Memory Technologies Co., Ltd., Hubei (CN)

(72) Inventors: Bo Cheng, Hubei (CN); XinKai Lv, Hubei (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/520,067

(22) Filed: Nov. 27, 2023

(65) Prior Publication Data
US 2025/0173067 A1 May 29, 2025

(51) Int. Cl.
*G06F 3/06* (2006.01)
*G06F 1/30* (2006.01)

(52) U.S. Cl.
CPC .............. *G06F 3/0619* (2013.01); *G06F 1/30* (2013.01); *G06F 3/0653* (2013.01); *G06F 3/0659* (2013.01); *G06F 3/0679* (2013.01)

(58) Field of Classification Search
CPC .... G06F 3/0619; G06F 3/0653; G06F 3/0659; G06F 3/0679; G06F 1/30; G06F 1/305
See application file for complete search history.

(56) References Cited

U.S. PATENT DOCUMENTS

| | | | | |
|---|---|---|---|---|
| 9,141,505 B1 * | 9/2015 | Crow | ................... | G06F 11/3037 |
| 2005/0272402 A1 * | 12/2005 | Ferentz | ................... | H04L 12/10 |
| | | | | 713/320 |
| 2005/0273638 A1 * | 12/2005 | Kaiju | ................... | G06F 1/3221 |
| 2018/0308527 A1 * | 10/2018 | Narayanan | ............ | G06F 3/0619 |
| 2021/0089225 A1 * | 3/2021 | Boyd | ................... | G06F 3/0679 |
| 2021/0255920 A1 * | 8/2021 | Bernat | ................. | G06F 12/0246 |
| 2025/0021432 A1 * | 1/2025 | Bernat | ................. | G06F 11/3034 |

OTHER PUBLICATIONS

Hur, Ibrahim, and Calvin Lin. "A comprehensive approach to DRAM power management." 2008 IEEE 14th International Symposium on High Performance Computer Architecture. IEEE, 2008. (Year: 2008).*

Yang, Junseok, Seokjun Lee, and Sungyong Ahn. "Selective Power-Loss-Protection Method for Write Buffer in ZNS SSDs." Electronics 11.7 (2022): 1086. (Year: 2022).*

* cited by examiner

*Primary Examiner* — Nicholas J Simonetti
(74) *Attorney, Agent, or Firm* — Hanley, Flight and Zimmerman, LLC

(57) ABSTRACT

Examples of the present application provide a memory system and an operation method thereof. The memory system includes: a non-volatile memory device; a power supply circuit coupled with the non-volatile memory device and configured to provide power after power-down occurs; and a memory controller coupled with the non-volatile memory device and the power supply circuit and configured to: write data into the non-volatile memory device in response to a current predictive power supply duration of the power supply circuit being less than a predictive writing duration of writing the data into the non-volatile memory device, wherein the data includes data to be written into the non-volatile memory device after the power-down occurs and before power supply of the power supply circuit ends.

20 Claims, 3 Drawing Sheets

Obtain a predictive power supply duration of a power supply circuit; and obtain a predictive writing duration of writing data into a non-volatile memory device — S501

Determine that the current predictive power supply duration of the power supply circuit of a memory system is less than the predictive writing duration of writing the data into the non-volatile memory device of the memory system, wherein the data comprises data that needs to be written into the non-volatile memory device after power-down occurs and before power supply of the power supply circuit ends — S502

Write the data into the non-volatile memory device in response to the current predictive power supply duration of the power supply circuit being less than the predictive writing duration of writing the data into the non-volatile memory device — S503

MEMORY SYSTEMS AND OPERATION METHODS THEREOF

TECHNICAL FIELD

Examples of the present application relates to the field of semiconductor technologies, and particularly to a memory system and an operation method thereof.

BACKGROUND

During a use process of a memory apparatus, in a scenario of power-down, data stored in a volatile memory of the memory apparatus will be written into a non-volatile memory device by virtue of discharge of an on-board capacitor.

DETAILED DESCRIPTION

Figure 1:
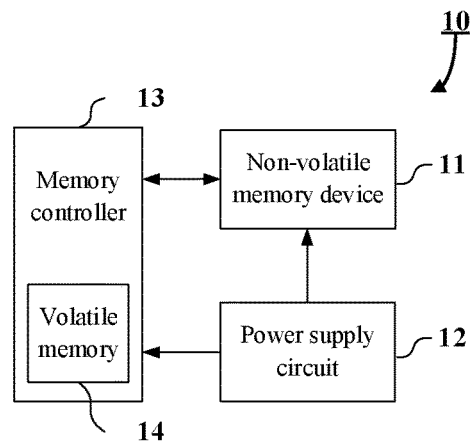
FIG. 1 is a block diagram of a memory system provided by examples of the present application.

The technical solutions in implementations of the present application will be described below clearly and completely in conjunction with the implementations and the drawings of the present application. The implementations described are only part of, but not all of, the implementations of the present application. All other implementations obtained by those of ordinary skill in the art based on the implementations in the present application without creative work shall fall within the scope of protection of the present application.

In the description below, many specific details are presented to provide a more thorough understanding of the present application. However, it is apparent to those skilled in the art that the present application may be carried out without one or more of these details. In other examples, in order to avoid confusing with the present application, some technical features well-known in the art are not described; that is, not all features of actual examples are described herein, and well-known functions and structures are not described in detail.

In the drawings, sizes and relative sizes of layers, areas and elements may be exaggerated for clarity. Like reference numerals denote like elements throughout.

It should be understood that when an element or a layer is referred to as being "on", "adjacent to", "connected to", or "coupled to" other elements or layers, it may be directly on, adjacent to, connected to, or coupled to the other elements or layers, or one or more intervening elements or layers may be present. In contrast, when an element is referred to as being "directly on", "immediately adjacent to", "directly connected to", or "directly coupled to" other elements or layers, no intervening elements or layers are present. It should be understood that, although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present application. When the second element, component, area, layer or portion is discussed, it does not mean that the first element, component, area, layer or portion is necessarily present in the present application.

The terms used herein are only intended to describe the specific examples, and are not used as limitations of the present application. As used herein, unless otherwise indicated expressly in the context, "a", "an" and "the" in a singular form are also intended to include a plural form. It should also be understood that the terms "consist of" and/or "comprise", when used in this specification, determine the presence of a feature, integer, step, operation, element and/or component, but do not preclude the presence or addition of one or more of other features, integers, steps, operations, elements, components, and/or groups. As used herein, the term "and/or" includes any and all combinations of the listed relevant items.

In order to understand the present application thoroughly, detailed procedures and detailed structures will be proposed in the following description to set forth the technical solution of the present application. The detailed descriptions of the examples of the present application are as follows. However, the present application may also have other implementations in addition to these

DETAILED DESCRIPTIONS

During a use process of a memory apparatus (e.g., a solid state disk, SSD), in a scenario of power-down, especially abnormal or sudden power-down, data stored in a volatile memory (e.g., a static random access memory, a register, a latch, etc.) of the memory apparatus needs to be written into a non-volatile memory device (e.g., a flash memory) by virtue of power provided by discharge of an on-board capacitor.

This process depends on a discharge capability of the on-board capacitor to some extent, and an insufficient discharge capability of the on-board capacitor may lead to loss of the data in the volatile memory of the memory apparatus. How to reduce a data loss risk in the volatile memory of the memory apparatus has become an issue to be addressed.

This process depends on a discharge capability of the on-board capacitor to some extent, and a current common practice is to evaluate the required capacitor capacity according to indicators such as power consumption, etc. of the memory apparatus in the design stage of the memory apparatus, and reserve a certain margin. A risk of data loss in the volatile memory caused by insufficient discharge time of the on-board capacitor is reduced by means of reserving the margin attenuation of the on-board capacitor in the design stage.

During the use process of the memory apparatus, the on-board capacitor will have a capacitance loss due to factors such as service time, environment, etc. The capacitance loss results in reduced discharge capability of the capacitor, and power provided by the on-board capacitor is not enough to write the data stored in the volatile memory into the non-volatile memory device, which causes a loss of the data in the volatile memory of the memory apparatus, eventually leading to the data loss of the memory apparatus. At the same time, the memory apparatus, especially the SSD, is restricted by factors such as size limitation, printed circuit board (PCB) limitation, etc., during hardware design. When the on-board capacitor and the SSD are integrated in the same printed circuit board, the redundancy for the on-board capacitor cannot be designed to be very large, and thus the practice of reserving a capacitance redundancy during the hardware design has limitations.

FIG. 1 is a block diagram of a memory system provided by examples of the present application. Referring to FIG. 1, according to a first aspect of the present application, examples of the present application provide a memory system 10 comprising: a non-volatile memory device 11; a power supply circuit 12 coupled with the non-volatile memory device 11 and configured to provide power after power-down occurs; and a memory controller 13 coupled with the non-volatile memory device 11 and the power supply circuit 12 and configured to: write data into the non-volatile memory device 11 in response to a current predictive power supply duration of the power supply circuit 12 being less than a predictive writing duration of writing the data into the non-volatile memory device 11, wherein the data comprises data to be written into the non-volatile memory device 11 after the power-down occurs and before power supply of the power supply circuit ends.

The memory system 10 comprises at least one non-volatile memory device 11 and a memory controller 13 coupled with the at least one non-volatile memory device 11. The memory system 10 may be the memory apparatus as described above, and may comprise an SSD, for example, an ESSD (Enterprise Solid State Disk).

The memory controller 13 can control overall operations of the memory system 10. The memory controller 13 may store data into the non-volatile memory device 11, or may read data stored in the non-volatile memory device 11.

The non-volatile memory device 11 may comprise at least one of a NAND flash memory, a Phase Change Memory (PCM), a Resistive Random Access Memory (RRAM), a Magnetoresistive Random Access Memory (MRAM), and a Nantero's CNT Random Access Memory (NRAM).

In some examples, the memory controller 13 comprises a volatile memory 14 configured to store data.

The volatile memory 14 may serve as a cache of the memory controller 13. In order to prevent the data loss, the memory controller 13 will store some data, i.e., write data, to the non-volatile memory device, before the power supply of the power supply circuit ends. The memory controller 13 may further store various information (e.g., metadata information and a mapping table) required by the operations of the memory system 10 to the volatile memory 14, and may access the non-volatile memory device 11 based on the information stored in the volatile memory 14.

The volatile memory 14 may include a memory device, such as a Dynamic Random-Access Memory (DRAM), a Static Random-Access Memory (SRAM), a Synchronous Dynamic Random-Access Memory (SDRAM) or a Double-Data-Rate Fourth Generation Synchronous Dynamic Random Access Memory (DDR4 SDRAM). In an example, the volatile memory device may be a Low Power Double Data Rate (LPDDR) DRAM.

The power supply circuit 12 is coupled with the memory controller 13 and with the non-volatile memory device 11, and configured to write the data in the volatile memory into the non-volatile memory device 11 by virtue of the power supply of the power supply circuit 12 in the scenario of power-down of the memory system.

The data is the data to be written into the non-volatile memory device 11 before the power supply of the power supply circuit ends. In some particular examples, the data includes the data stored in the volatile memory of the memory system 10. In an example, the data may include data stored in a page buffer, and the data stored in the page buffer may include data read from the non-volatile memory device 11 and data written into the non-volatile memory device 11 in response to a control signal of the memory controller. In some particular examples, the data includes data stored in a volatile memory of the memory controller. In an example, the data may include data such as state information, command operation codes (OP codes), and command addresses, etc. stored in the register for operations of the memory controller.

Here and below, an illustration is made by taking the memory system 10 being an SSD as an example, and the non-volatile memory device 11 being a NAND flash memory as an example. However, these examples should not be understood as limitations to the implementations of the present application.

Here and below, the term "flush" may be understood as an action of writing the data in the volatile memory of the SSD into the NAND flash memory; the term "flush task" may be understood as a process of writing the data in the volatile memory of the SSD into the NAND flash memory; and the term "trigger a flush task" may be understood as starting to perform the writing of the data in the volatile memory of the SSD into the NAND flash memory.

In some examples, the memory controller is configured to: obtain a current predictive power supply duration of the power supply circuit; and obtain a predictive writing duration of writing the data into the non-volatile memory device.

The method by which the memory controller obtains the current predictive power supply duration of the power supply circuit and obtains the predictive writing duration of writing the data into the non-volatile memory device may be achieved by using a relevant hardware collection circuit in the memory system, or by measurement and further calculation processing of relevant parameters by using a virtual measurement module implemented by relevant software in the memory.

The memory controller 13 is configured to write the data into the non-volatile memory device 11 in response to the current predictive power supply duration of the power supply circuit 12 being less than the predictive writing duration of writing the data into the non-volatile memory device 11.

In the examples of the present application, by obtaining the current predictive power supply duration of the power supply circuit 12 and the predictive writing duration of the data, when the current predictive power supply duration of the power supply circuit 12 is less than the predictive writing duration of the data, the data is written into the non-volatile memory device 11. When the current predictive power supply duration of the power supply circuit 12 is less than the predictive writing duration of the data, there is a risk of loss of the data in the volatile memory during the power-down, and the problem of the loss of user data of the memory system 10 caused by the data loss in the volatile memory of the memory system 10 can be greatly reduced by writing the data into the non-volatile memory device 11.

In some examples, the power supply circuit comprises a capacitor; and the memory controller is configured to: obtain a current capacity of the capacitor; obtain corresponding power consumption of the non-volatile memory device and the memory controller in a plurality of load states respectively; obtain the number of corresponding input/output ports for data transmission in the plurality of load states respectively and the number of input/output ports currently used for data transmission; obtain a proportion of load states of current input/output ports with respect to corresponding load states in the plurality of load states respectively according to the number of the corresponding input/output ports for data transmission in the plurality of load states respectively and the number of the input/output ports currently used for data transmission; and obtain corresponding current predictive power supply duration of the power supply circuit in the plurality of load states according to the current capacity of the capacitor, the corresponding power consumption in the plurality of load states respectively, and the proportion of the load states of the current input/output ports in the plurality of load states.

Considering the loss generated in the capacitor due to factors such as service time, environment, etc., the current capacity of the capacitor may be understood as a real capacity of the capacitor after use for a period of time. In some particular examples, the real capacity of the capacitor may be measured by a capacitor capacity collection circuit in the memory system. The capacitor capacity collection circuit comprises an input interface and an output interface, wherein the input interface is connected with the capacitor, and the output interface is connected with the memory controller and outputs the current capacity of the capacitor. When the capacitor is powered on, the capacitor capacity collection circuit obtains the current capacity of the capacitor by measuring the time required for the capacitor to be charged to a target voltage, and the current capacity may be stored in the memory controller for later use. In some examples, the plurality of load states may include two, three or more load states (e.g., five load states).

In some particular examples, the plurality of load states include a Max Load state, an Idle Load state and a Normal Load state, wherein a load corresponding to the Normal Load state is between a load corresponding to the Max Load state and a load corresponding to the Idle Load state.

In some particular examples, the plurality of load states may include a Max Load state, a Normal Load state and an Idle Load state of the SSD. During the use process of the SSD, the loads differ from each other. The Max Load state of the SSD may represent a running state of the SSD in a rated load, the Normal Load state of the SSD may represent a running state of the SSD in a normal load, and the Idle Load state of the SSD may represent a running state of the SSD in an idle load. Here and below, an illustration is made by taking the plurality of load states being the Max Load state, the Normal Load state and the Idle Load state as an example, but the examples cannot be understood as limitations to the implementations of the present application. In the following equations, the Max Load state, the Normal Load state and the Idle Load state are referred to as a Max state, a Normal state and an Idle state for short respectively.

In some particular examples, a discharge capability of the capacitor has certain relevance to the capacity of the capacitor and the power consumption of the SSD, and the power consumption of the SSD also has certain relevance to a running situation of a firmware (FW) of the SSD. The discharge capability T of the capacitor may be expressed as a function related to the capacity (Capacity) of the capacitor and the power consumption (Power) of the SSD, as shown in Equation (1) below:

$$T = f(\text{Capacity}, \text{Power}), \quad (1)$$

The discharge capability of the capacitor may be understood as a capability of the capacitor after being charged to release charges stored in the capacitor during a discharge process of the capacitor. The discharge capability of the capacitor depends on the capacitor capacity of the capacitor, a quantity of charges and resistance in a circuit during the discharge process of the capacitor.

It is assumed that the capacity of the on-board capacitor (which may be understood as the power supply circuit) of the SSD is a standard capacitor capacity $C_{Standard}$ (Standard Capacity), the power consumption P in the Max state, the Normal State and the Idle state of the SSD is $P_{Max}$, $P_{Normal}$ and $P_{Idle}$ respectively, and the number (e.g., the number of the input/output ports (IOs) per second) of the IOs corresponding thereto which receive the data are $IO_{Max}$, $IO_{Normal}$ and $IO_{Idle}$ respectively. Here and below, the number of the input/output ports (or the number of IOs) may be understood as the number of the input/output ports (IOs) that receive the data; for example, the number of IOs per unit time (e.g., per second) may be understood as the number of input/output ports (IOs) that receive the data per unit time (e.g., per second).

Discharge time $T_{Reference}$ of the capacitor of the SSD in different loads can be known by pre-measuring the SSD, as shown in Equation (2) below:

$$T_{Reference} = \{T_{ReferenceMax}, T_{ReferenceNormal}, T_{ReferenceIdle}\}, \quad (2)$$

By pre-measuring the SSD, the discharge time $T_{ReferenceMax}$, $T_{ReferenceNormal}$ and $T_{ReferenceIdle}$ of the capacitor of the SSD in the Max state, the Normal State and the Idle state may be as shown in Equations (3), (4) and (5) below respectively:

$$T_{ReferenceMax} = C_{Standard}/P_{Max}, \quad (3)$$

$$T_{ReferenceNormal} = C_{Standard}/P_{Normal} \quad (4)$$

$$T_{ReferenceIdle} = C_{Standard}/P_{Idle}, \quad (5)$$

In some particular examples, when the FW of the SSD runs, the current load may be evaluated according to the number of IOs that receive the data currently (e.g., the number of current IOs per second) to obtain a weight estimate Weight, as shown in Equation (6) below:

$$\text{Weight} = IO_{Reference}/IO_{Current}, \quad (6)$$

Based on the discharge capability $T_{ReferenceNormal}$ of the capacitor in different loads, the predictive discharge time of the capacitor in one current FW running state of the SSD may be obtained, which may be expressed as in Equation (7) below:

$$T_{Predictive} = T_{Reference} * \text{Weight}, \quad (7)$$

In some other particular examples, considering that the capacitor on the SSD will have certain attenuation with time, resulting in shortened discharge time, a real value $C_{Real}$(Real Capacity) of the capacitor should be considered for the real discharge time estimate of the capacitor, and the predictive discharge time of the capacitor may be also expressed as shown in Equation (8) below:

$$T_{Predictive}=T_{Reference}*\text{Weight}*C_{Real}/C_{Standard}, \quad (8)$$

The predictive discharge time $T_{Predictive}$ of the capacitor and the discharge capability $T_{Reference}$ of the capacitor have the same data structure, corresponding to three levels respectively, i.e., an actual data structure of $T_{Predictive}$, and the predictive discharge time $T_{Predictive}$ of the capacitor may be obtained according to Equation (7) or (8) above, as shown in Equation (9) below:

$$T_{Predictive}=\{I_{PredictiveMax}, T_{PredictiveNormal}, T_{PredictiveIdle}\}, \quad (9)$$

In some particular examples, Equation (9) above may be understood as a discharge time $T_{Current}$ estimate of the capacitor of the SSD at the current moment, as shown in Equation (10) below:

$$T_{Current}=\{T_{CurrentMax}, T_{CurrentNormal}, T_{CurrentIdle}\}, \quad (10)$$

The discharge time of the capacitor at the current moment and the predictive discharge time of the capacitor correspond to the real discharge time of the capacitor and have the same data structure, including values in three states (in the Max state, the Normal state and the Idle state). In some particular examples, the discharge time of the capacitor at the current moment in each state is an array. In an example, in the Max state of the SSD, the discharge time $T_{CurrentMax}$ of the capacitor at the current moment, the predictive discharge time $T_{PredictiveMax}$ of the capacitor and the discharge capability $T_{ReferenceMax}$ of the capacitor are of the same array structure.

In some particular examples, a data volume $S_{Data}$ to be written into the NAND flash memory before the power-down will be evaluated, so as to estimate the time $T_{Expect}$ required to write these data into the NAND flash memory, as shown in Equation (11) below:

$$T_{Expect}=S_{Data}/\text{Write}_{Speed}, \quad (11)$$

A writing speed $\text{Write}_{Speed}$ is a set of values corresponding to power consumption testing, and is a set of fixed values after the development of the FW of the SSD is finished, and different load states correspond to different writing speeds. Still taking the Max state, the Normal State and the Idle state as an example, the writing speed $\text{Write}_{Speed}$ is as shown in Equation (12) below:

$$\text{Write}_{Speed}=\{\text{Write}_{SpeedMax}, \text{Write}_{SpeedNormal}, \text{Write}_{SpeedIdle}\}, \quad (12)$$

In some examples, the memory controller is configured to: obtain a data volume of the data; obtain corresponding writing speeds of writing the data into the non-volatile memory device in the plurality of load states respectively; and obtain corresponding predictive writing durations of writing the data into the non-volatile memory device in the plurality of load states respectively according to the data volume of the data and the writing speeds of writing the data into the non-volatile memory device in the plurality of load states.

In some particular examples, the data volume $S_{Data}$ to be written into the non-volatile memory device 11 before the power-down will be evaluated, so as to estimate the time $T_{Expect}$ required to write these data into the non-volatile memory device 11, that is, the predictive writing duration $T_{Expect}$ at the current moment, as shown in Equation (13) below:

$$T_{Expect}=\{T_{ExpectMax}, T_{ExpectNormal}, T_{ExpectIdle}\}, \quad (13)$$

The predictive writing duration $T_{Expect}$ at the current moment is used to compare with the discharge time $T_{Current}$ of the capacitor at the current moment.

In a particular example, a virtual data volume measurement module implemented by relevant software in the memory controller may be used for measurement to obtain the data volume of the data. In some examples, the memory controller is configured to: compare the current predictive power supply duration of the power supply circuit with the predictive writing duration of writing the data into the non-volatile memory device in the plurality of load states respectively; and write the data into the non-volatile memory device when the current predictive power supply duration is less than the predictive writing duration in any of the load states.

In any of the plurality of load states, by comparing $T_{Expect}$ in the load state with $T_{Current}$ in the load state, when $T_{Expect}$ is less than $T_{Current}$, the data is written into the non-volatile memory device.

In an example, in the Normal state of the SSD, the discharge time of the capacitor at the current moment is $T_{CurrentNormal}$ (which may be understood as the predictive discharge time $T_{PredictiveNormal}$ of the capacitor at the current moment), the predictive writing duration of writing the data into the non-volatile memory device at the current moment is $T_{ExpectNormal}$, and when $T_{PredictiveNormal}$ is less than $T_{ExpectNormal}$, the data is written into the non-volatile memory device 11.

Figure 2:
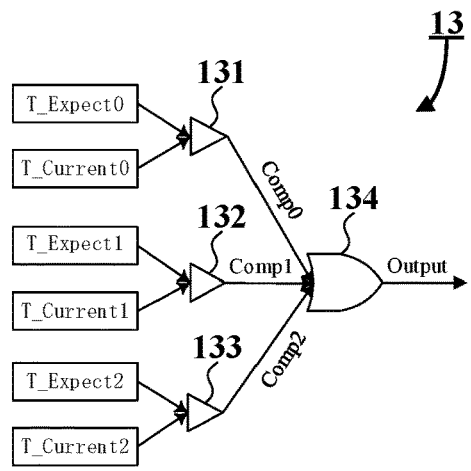
FIG. 2 is a schematic diagram of a comparison circuit of a memory controller provided by examples of the present application.

FIG. 2 is a schematic diagram of a comparison circuit of a memory controller provided by examples of the present application. Referring to FIG. 2, in some examples, the memory controller 13 comprises: a plurality of comparators 131, 132, 133, corresponding to the plurality of load states, wherein each of the plurality of comparators is configured to compare the current predictive power supply duration in one corresponding load state with the predictive writing duration, and output a comparison result; and an OR gate 134 coupled with each of the plurality of comparators and configured to obtain a sign signal for characterizing the comparison results in the plurality of load states based on the comparison result output by each of the plurality of comparators, wherein the sign signal is configured to indicate whether to write the data into the memory device.

In an example, indexes are established for $T_{ExpectMax}$, $T_{ExpectNormal}$, and $T_{ExpectIdle}$ as well as $T_{CurrentMax}$, $T_{CurrentNormal}$, and $T_{CurrentIdle}$ respectively, to obtain indexes T_Expect0, T_Expect1 and T_Expect2 as well as T_Current0, T_Current1 and T_Current2 characterizing values of $T_{ExpectMax}$, $T_{ExpectNormal}$, and $T_{ExpectIdle}$ as well as $T_{CurrentMax}$, $T_{CurrentNormal}$, and $T_{CurrentIdle}$. The comparator 131 outputs a comparison result Comp0 according to the indexes T_Expect0 and T_Current0, the comparator 132 outputs a comparison result Comp1 according to the indexes T_Expect1 and T_Current1, and the comparator outputs a comparison result Comp2 according to the indexes T_Expect2 and T_Current2.

If T_Expect0 is greater than T_Current0, the output comparison result Comp0 is true; if T_Expect1 is greater than T_Current1, the output comparison result Comp1 is true; and if T_Expect2 is greater than T_Current2, the output comparison result Comp2 is true. If at least one of the comparison result Comp0, the comparison result Comp1 and the comparison result Comp2 is true, then an output result Output of the OR gate 134 is true, and a flush task is triggered according to the output result Output being true, so as to write the data into the non-volatile memory device.

In some particular examples, the prediction of the discharge time of the capacitor at the current moment and the prediction of the predictive writing duration of storing the data into the non-volatile memory device comprise: storing a value of the pre-measured discharge time $T_{Reference}$ of the capacitor in different loads and a value of the number $IO_{Reference}$ of the input/output ports (IOs) that receive the data corresponding thereto in a global variable of the FW during power-on initialization of the FW of the SSD, and obtaining a real value $C_{Real}$ of the capacitor; establishing a background task $Task_{Background}$ during a running process of the FW; counting current running states of the FW using the background task $Task_{Background}$ (for example, by counting the number of IOs per second in the FW) to obtain the discharge time estimate of the capacitor at the current moment, as shown in Equation (10) above; evaluating the data volume $S_{Data}$ to be written into the NAND flash memory before the power-down, so as to estimate the time $T_{Expect}$ required to write these data into the NAND flash memory, as shown in Equation (11) above.

$Write_{Speed}$ is a set of values corresponding to the power consumption testing, and is a set of fixed values after the development of the FW of the SSD is finished, as shown in Equation (12) above. The prediction of the discharge time $T_{Current}$ of the capacitor at the current moment and the prediction of the predictive writing duration $T_{Expect}$ of storing the data into the memory device may be referred to Equations (13) and (10) above respectively.

In some particular examples, indexes T_Expect and T_Current are established for $T_{Expect}$ and $T_{Current}$; the indexes T_Expect and T_Current are used to characterize values of $T_{Expect}$ and $T_{Current}$ respectively; the values of $T_{Expect}$ and $T_{Current}$ are compared according to the indexes T_Expect and T_Current; and if an output comparison result for T_Expect being greater than T_Current is true, then the flush task is triggered. In an example, indexes are established for $T_{ExpectMax}$, $T_{ExpectNormal}$, and $T_{ExpectIdle}$ as well as $T_{CurrentMax}$, $T_{CurrentNormal}$, and $T_{CurrentIdle}$ respectively, values are compared between $T_{ExpectMax}$ and $T_{CurrentMax}$, between $T_{ExpectNormal}$ and $T_{CurrentNormal}$, and between $T_{ExpectIdle}$ and $T_{CurrentIdle}$; and finally, the flush task is triggered as long as a result of one of the comparisons is true.

In some examples, the power supply circuit comprises a capacitor; and the memory controller is configured to: obtain the current capacity $C_{Real}$ of the capacitor; obtain the current power consumption $P_{Current}$ of the memory device and the memory controller; and obtain the current predictive power supply duration $T_{Current}$ of the power supply circuit according to the current capacity and the current power consumption.

In some particular examples, the current predictive power supply duration $T_{Current}$ of the power supply circuit is as shown in Equation (14) below:

$$T_{Current} = C_{Real}/P_{Current}, \qquad (14)$$

During the power-on initialization of the FW of the SSD, a real value $C_{Real}$ of the capacitor is obtained; the current load may be evaluated according to the number $IO_{Current}$ of the IOs that receive the data currently (for example, the current number of the IOs per second) when the FW of the SSD is running, so as to obtain the current power consumption $P_{Current}$; and $T_{Current}$ can be obtained by Equation (14) above.

In some examples, the memory controller is configured to: obtain the data volume $S_{Data}$ of the data; obtain the writing speed $Write_{Speed}$ of writing the current data into the memory device; and obtain the predictive writing duration $T_{Expect}$ of storing the data into the memory device according to the data volume of the data and the predictive writing speed of writing the data into the memory device.

In some particular examples, the predictive writing duration $T_{Expect}$ of storing the data into the memory device may be obtained by Equation (11) above.

After the development of the FW of the SSD is finished, $Write_{Speed}$ is a set of fixed values; the data volume $S_{Data}$ received currently (for example, the current data volume per second) may be obtained when the FW is running, and $T_{Expect}$ can be obtained by Equation (11) above In some examples, the indexes T_Expect and T_Current are established for $T_{Expect}$ and $T_{Current}$, and the indexes T_Expect and T_Current are used to characterize values of $T_{Expect}$ and $T_{Current}$ respectively. Values of $T_{Expect}$ and $T_{Current}$ are compared according to the indexes T_Expect and T_Current; and if an output comparison result for T_Expect being greater than T_Current is true, then the flush task is triggered.

In some examples, the memory controller is configured to: periodically obtain the predictive power supply duration of the power supply circuit and the predictive writing duration of storing the data into the memory device; and adjust a period of obtaining the predictive power supply duration of the power supply circuit and the predictive writing duration of storing the data into the memory device according to a difference between the predictive writing duration of storing the data into the memory device and the predictive power supply duration of the power supply circuit.

In some particular examples, when this difference increases, the period of obtaining the predictive power supply duration of the power supply circuit and the predictive writing duration of storing the data into the memory device may be decreased, i.e., a frequency of obtaining the predictive power supply duration of the power supply circuit and the predictive writing duration of storing the data into the memory device is increased. A frequency of triggering the flush task of the memory system will be increased, for example, in the scenario of abnormal power-down of the memory system, data recovery may be performed through the data for which the memory system has finished flush prior to the power-down, so as to enhance the data reliability of the memory system.

In some particular examples, when this difference decreases, the period of obtaining the predictive power supply duration of the power supply circuit and the predictive writing duration of storing the data into the memory device may be increased, i.e., the frequency of obtaining the predictive power supply duration of the power supply circuit and the predictive writing duration of storing the data into the memory device is decreased. The frequency of triggering the flush task of the memory system will be decreased, for example, in the scenario of the abnormal power-down of the memory system, the data recovery may be performed through the data for which the memory system has finished flush prior to the power-down or through the data for which the memory system finishes the flush after the power-down, so as to enhance the data reliability of the memory system.

In the examples of the present application, in a scenario of general use, the flush task of the SSD will not be triggered frequently, and the influence on the performance of the SSD is substantially negligible.

In the examples of the present application, in a scenario of extreme use, the discharge capability of the capacitor would be insufficient to meet the demands of data flush in the volatile memory of the SSD. At this point, the performance of the SSD is no longer the most concerned indicator of the SSD, and the most important indicator at this point is the reliability of the data.

Figure 3:
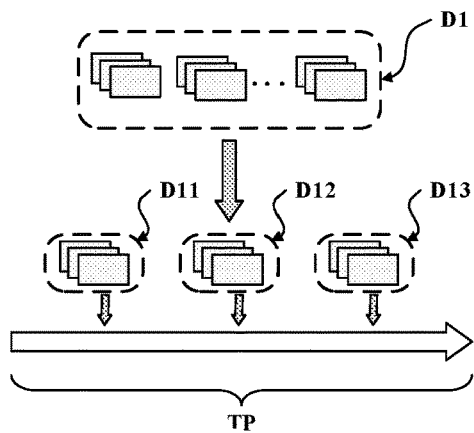
FIG. 3 is a schematic diagram of a memory system adopting a time-sharing flush strategy provided by examples of the present application.

FIG. 3 is a schematic diagram of a memory system adopting a time-sharing flush strategy provided by examples of the present application. Referring to FIG. 3, in some examples, the memory controller is configured to: split the data into a plurality of sub-data; and spread the plurality of sub-data over a period of time and write them into the memory device.

In an example, the data D1 is split into 3 sub-data D11, D12, D13, which are spread over a period of time TP and written into the memory device.

In the examples of the present application, with the time-sharing flush strategy, the flush task is spread over the period of time TP, so as to reduce the influence on the performance of the SSD. In an example, the flush task of the data D1 is spread as the flush tasks of the 3 sub-data D11, D12 and D13, which are finished respectively after being spread over the period of time TP.

Figure 4:
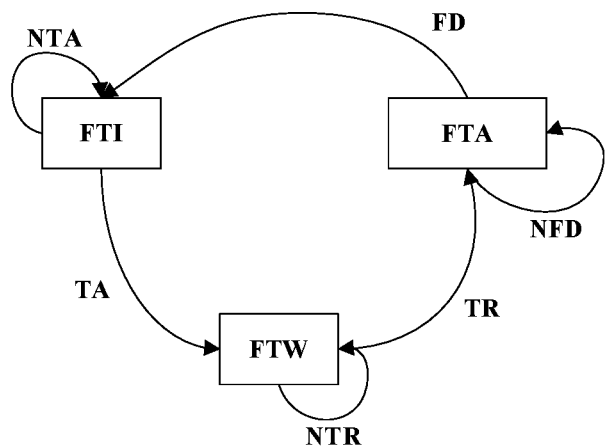
FIG. 4 is a schematic diagram of running of a state machine of a flush task of a memory system provided by examples of the present application.

FIG. 4 is a schematic diagram of running of a state machine of a flush task of a memory system provided by examples of the present application. Referring to FIG. 4, in some examples, the flush task of one period comprises three different task states: an Idle state FTI, a Wait state FTW and an Active Flush state FTA; the flush task of one period is to write each sub-data into the memory device within a period of time; the memory controller is configured to be: in the Idle state FTI of the current period when the flush task of a previous period has finished FD or when the flush task of the current period does not trigger NTA, in the Wait state FTW of the current period when the flush task of the current period has triggered TA or when wait time of the Wait state of the current period does not reach NTR, and in the Active Flush state FTA of the current period when the wait time of the Wait state of the current period has reached TR or when the flush task of the current period does not finish NFD.

Various examples of the present application propose a strategy based on discharge capability prediction of the power supply circuit. The strategy covers the risk of data loss in the volatile memory during the power-down from a software level, which can greatly reduce the problem of the data loss of the memory system due to the data loss in the volatile memory of the memory system.

The strategy can reduce the risk of the data loss in the volatile memory, and can reduce a redundancy of the capacitor during the hardware design to some extent, thereby reducing overall cost of the memory system.

The strategy has wide applicability, and can ensure that the discharge capability of the memory system is sufficient to support the writing of data in the volatile memory into the non-volatile memory device in any use state, according to different use environments and use states of the memory system.

Figure 5:
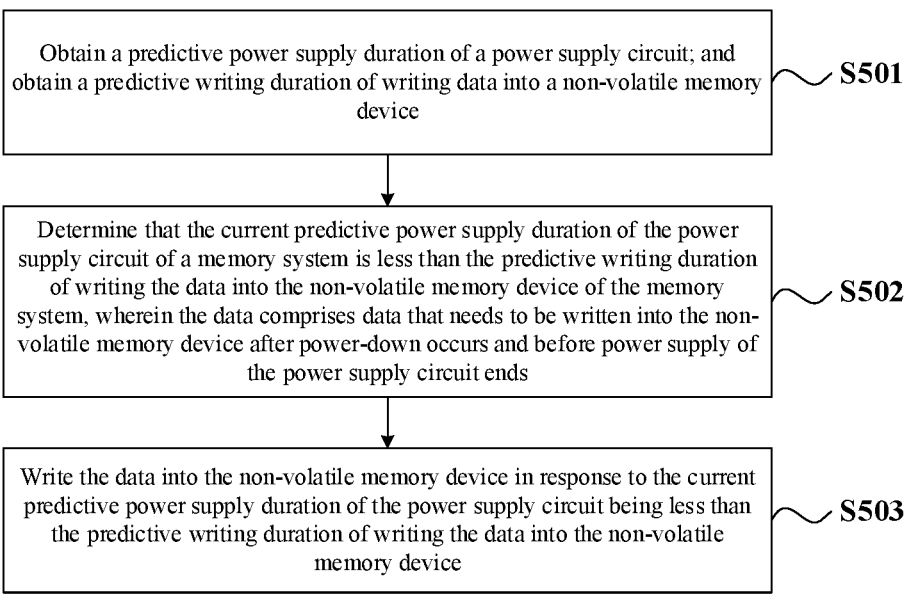
FIG. 5 is a flow diagram of an operation method of a memory system provided by examples of the present application.

FIG. 5 is a flow diagram of an operation method of a memory system provided by examples of the present application. Referring to FIG. 5, according to a second aspect of the present application, the examples of the present application provide an operation method of a memory system, comprising: S502, determining that a current predictive power supply duration of a power supply circuit of the memory system is less than a predictive writing duration of writing data into a non-volatile memory device of the memory system, wherein the data comprises data to be written into the non-volatile memory device after power-down occurs and before power supply of the power supply circuit ends; and S503, writing the data into the non-volatile memory device in response to the current predictive power supply duration of the power supply circuit being less than the predictive writing duration of writing the data into the non-volatile memory device.

In the examples of the present application, by predicting the current predictive power supply duration of the power supply circuit 12 and the predictive writing duration of the data, when the current predictive power supply duration of the power supply circuit 12 is less than the predictive writing duration of the data, the data is written into the non-volatile memory device 11.

When the current predictive power supply duration of the power supply circuit 12 is less than the predictive writing duration of the data, which means that there is a risk of data loss in a volatile memory during power-down, the problem of the data loss of the memory system 10 caused by the data loss in the volatile memory of the memory system 10 can be greatly reduced by writing the data into the non-volatile memory device 11 at this point.

Referring to FIG. 5, in some examples, the operation method further comprises: S501, obtaining a predictive power supply duration of the power supply circuit; and obtaining a predictive writing duration of writing the data into the non-volatile memory device.

In some particular examples, the power supply circuit 12 comprises a capacitor; the memory controller 13 comprises a capacitor capacity collection circuit and a data volume collection circuit. The capacitor capacity collection circuit obtains a capacity of the capacitor and outputs the current predictive power supply duration of the capacitor based on the capacity; and the data volume collection circuit obtains a data volume of the data and outputs the predictive writing duration of writing the data into the non-volatile memory device 11 based on the data volume of the data.

In some examples, obtaining the predictive power supply duration of the power supply circuit comprises: obtaining a current capacity of the capacitor of the power supply circuit; obtaining corresponding power consumption of the non-volatile memory device and the memory controller in a plurality of load states respectively; obtaining the number of corresponding input/output ports for data transmission in the plurality of load states respectively and the number of input/output ports currently used for data transmission; obtaining a proportion of load states of the current input/output ports with respect to corresponding load states in the plurality of load states respectively according to the number of the corresponding input/output ports for data transmission in the plurality of load states respectively and the number of the input/output ports currently used for data transmission; and obtaining corresponding current predictive power supply durations of the power supply circuit in the plurality of load states according to the current capacity of the capacitor, the corresponding power consumption in the plurality of load states respectively, and the proportion of the load states of the current input/output ports in the plurality of load states.

In an example, during power-on initialization of the FW, values of $T_{Reference}$ and $IO_{Reference}$ are stored in a global variable of the FW, and a real value $C_{Real}$ of the capacitor is obtained; during a running process of the FW, a background task $Task_{Background}$ is established; the current running states of the FW are counted using the background task $Task_{Background}$, that is, the number of IOs per second in the FW is counted such that a discharge time estimate of the capacitor at the current moment is obtained, as shown in Equation (10) above.

In some examples, obtaining the predictive writing duration of writing the data into the memory device comprises: obtaining a data volume of the data; obtaining corresponding writing speeds of writing the data into the non-volatile memory device in the plurality of load states respectively; and obtaining corresponding predictive writing durations of writing the data into the non-volatile memory device in the plurality of load states respectively according to the data volume of the data and the writing speeds of writing the data into the non-volatile memory device in the plurality of load states.

In an example, in any of the plurality of load states, a data volume $S_{Data}$ to be written into the NAND flash memory before the power-down will be estimated, and the time $T_{Expect}$ required to write these data into the NAND flash memory is estimated, as shown in Equation (11) above. $Write_{Speed}$ is a set of values corresponding to the power consumption testing, and is a set of fixed values after the development of the FW of the SSD is finished, as shown in Equation (12) above.

In some examples, being in response to the current predictive power supply duration of the power supply circuit being less than the predictive writing duration of storing the data into the memory device comprises: comparing the current predictive power supply duration of the power supply circuit with the predictive writing duration of writing the data into the non-volatile memory device in the plurality of load states respectively; and writing the data into the non-volatile memory device when the current predictive power supply duration is less than the predictive writing duration in any of the loading states.

In an example, in any of the plurality of load states, when $T_{Expect}$ is less than $T_{Current}$, the data is written into the non-volatile memory device.

In some examples, obtaining the predictive power supply duration of the power supply circuit comprises: obtaining the current capacity of the capacitor of the power supply circuit; obtaining the current power consumption of the memory device and the memory controller; and obtaining the current predictive power supply duration of the power supply circuit according to the current capacity and the current power consumption.

By substituting Equations (3)-(6) above into Equation (7) above, Equation (7) above may be also expressed as shown in Equation (15) below:

$$T_{Predictive} = C_{Standard}/P * C_{Real}/C_{Standard} = C_{Real}/P, \quad (15)$$

Alternatively, by substituting Equations (3)-(6) above into Equation (8) above, Equation (8) above may be also expressed as shown in Equation (16) below:

$$T_{Predictive} = C_{Standard}/P * Weight * C_{Real}/C_{Standard} = C_{Real} * Weight/P, \quad (16)$$

In an example, according to Equation (15) or (16) above, the current capacity $C_{Real}$ of the capacitor of the power supply circuit is obtained; the current power consumption P or Weight/P of the memory device and the memory controller is obtained; and the current predictive power supply duration $T_{predictive}$ of the power supply circuit (or the corresponding predictive writing duration $T_{Expect}$ of writing the data into the non-volatile memory device) is obtained according to the current capacity $C_{Real}$ and the current power consumption P or Weight/P.

In some examples, obtaining the predictive writing duration of storing the data into the memory device comprises: obtaining the data volume of the data; obtaining the writing speed of writing current data into the memory device; and obtaining the predictive writing duration of storing the data into the memory device according to the data volume of the data and the predictive writing duration of writing the data into the memory device.

In an example, the data volume $S_{Data}$ of the data and the writing speed $Write_{Speed}$ of writing the current data into the memory device are obtained, and the predictive writing duration $T_{Expect}$ of storing the data into the memory device is obtained according to a ratio relationship of the data volume $S_{Data}$ of the data and the predictive writing speed $Write_{Speed}$ of writing the data into the memory device, as shown in Equation (11) above.

In some examples, the operation method further comprises: periodically obtaining the predictive power supply duration of the power supply circuit and the predictive writing duration of storing the data into the memory device; and adjusting a period of obtaining the predictive power supply duration of the power supply circuit and the predictive writing duration of storing the data into the memory device according to a difference between the predictive writing duration of storing the data into the memory device and the predictive power supply duration of the power supply circuit.

In some examples, writing the data into the memory device comprises: splitting the data into a plurality of sub-data; and spreading the plurality of sub-data over a period of time and writing them into the memory device.

In the examples of the present application, with the time-sharing flush strategy, the flush task is spread over the period of time TP, so as to reduce the influence on the performance of the SSD. In an example, the flush task of the data D1 is spread as the flush tasks of the 3 sub-data D11, D12 and D13, which are finished respectively after being spread over the period of time TP.

The memory system used in the operation method of the memory system provided by various examples of the present application is similar to the memory system in the above examples. The technical features not disclosed exhaustively in the examples of the present application may be understood with reference to the memory system in the above examples, and are no longer repeated.

Figure 6:
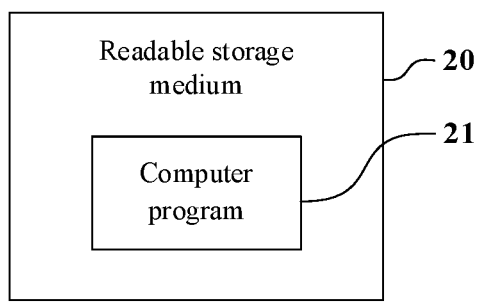
FIG. 6 is a block diagram of a readable storage medium provided by examples of the present application.

FIG. 6 is a block diagram of a readable storage medium provided by examples of the present application. Referring to FIG. 6, the examples of the present application provide a readable storage medium 20 storing a computer program 21. When the computer program 21 is executed, the operation method of any of the above examples is achieved.

The operation method comprises: determining that a current predictive power supply duration of a power supply circuit of the memory system is less than a predictive writing duration of writing data into a non-volatile memory device of the memory system, wherein the data comprises data to be written into the non-volatile memory device after power-down occurs and before power supply of the power supply circuit ends; and writing the data into the non-volatile memory device in response to the current predictive power supply duration of the power supply circuit being less than the predictive writing duration of writing the data into the non-volatile memory device.

According to a third aspect of the present application, examples of the present application provide a memory system, comprising: a non-volatile memory device, a capacitor and a memory controller, wherein the capacitor is coupled with the non-volatile memory device and the memory controller; the memory controller is connected with the non-volatile memory device and configured to: control whether to trigger a data writing task currently according to a current capacity of the capacitor in conjunction with the number of input/output ports of the memory controller and the non-volatile memory device that transmit data currently and a data volume of the data, wherein the data comprises data to be written into the non-volatile memory device after power-down occurs and before power supply of the capacitor ends.

Figure 7:
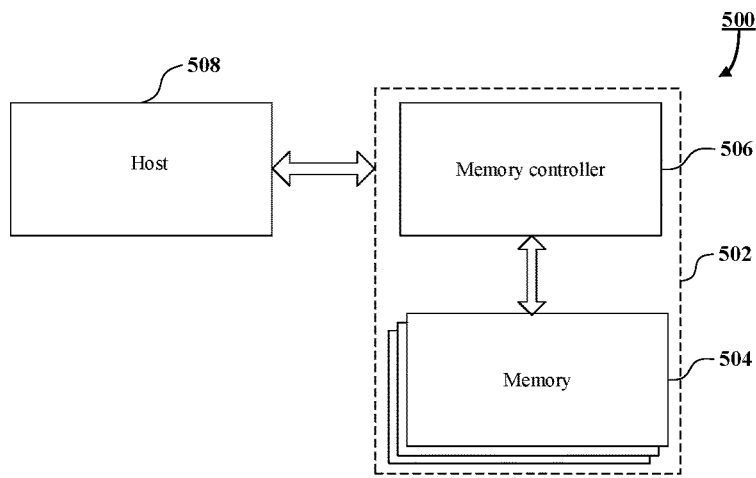
FIG. 7 is a schematic diagram of an example system having a memory system according to examples of the present application.

FIG. 7 shows a block diagram of an example system 500 having a memory according to some aspects of the present application. The system 500 may be a mobile phone, a desktop computer, a laptop computer, a tablet computer, a vehicle computer, a gaming console, a printer, a positioning apparatus, a wearable electronic apparatus, a smart sensor, a virtual reality (VR) apparatus, an augmented reality (AR) apparatus, or any other suitable electronic apparatuses having memories therein. As shown in FIG. 7, the system 500 may comprise a host 508 and a memory system 502, wherein the memory system 502 has one or more non-volatile memory devices 504 and a memory controller 506. The host 508 may be a processor (e.g., a central processing unit (CPU)) or a system on chip (SOC) (e.g., an application processor (AP)) of an electronic apparatus. The host 508 may be configured to send or receive data to or from the non-volatile memory devices 504.

The non-volatile memory devices 504 may be any memory in the present application. As disclosed below in detail, the non-volatile memory devices 504, e.g., NAND flash memories (such as, three-dimensional (3D) NAND flash memories), may have a reduced leakage current from a drive transistor (e.g., a string driver) coupled to unselected word lines during erase operations, which allows for further reduction of the size of the drive transistor.

According to some implementations, the memory controller 506 is coupled to the non-volatile memory devices 504 and the host 508, and configured to control the non-volatile memory devices 504. The memory controller 506 can manage the data stored in the non-volatile memory devices 504 and communicate with the host 508. In some implementations, the memory controller 506 is designed for operating in a low duty-cycle environment such as Secure Digital (SD) cards, Compact Flash (CF) cards, Universal Serial Bus (USB) flash drives, or other media for use in electronic apparatuses, such as personal computers, digital cameras, mobile phones, etc. In some implementations, the memory controller 506 is designed for operating in high duty-cycle environment SSDs or embedded Multi-Media Cards (eMMCs) used as data memories for mobile apparatuses, such as smartphones, tablet computers, laptop computers, etc., and enterprise memory arrays.

The memory controller 506 may be configured to control operations of the non-volatile memory devices 504, such as read, erase, and program operations. The memory controller 506 may be further configured to manage various functions with respect to data stored or to be stored in the non-volatile memory devices 504, including, but not limited to bad-block management, garbage collection, logical-to-physical address conversion, wear leveling, etc. In some implementations, the memory controller 506 is further configured to process error correction codes (ECCs) with respect to the data read from or written into the non-volatile memory devices 504. The memory controller 506 may further perform any other suitable functions as well, for example, formatting the non-volatile memory devices 504. The memory controller 506 may communicate with an external apparatus (e.g., the host 508) according to a particular communication protocol. For example, the memory controller 506 may communicate with the external apparatus through at least one of various interface protocols, such as a USB protocol, a MMC protocol, a Peripheral Component Interconnection (PCI) protocol, a PCI-Express (PCI-E) protocol, an Advanced Technology Attachment (ATA) protocol, a Serial-ATA protocol, a Parallel-ATA protocol, a Small Computer Small Interface (SCSI) protocol, an Enhanced Small Disk Interface (ESDI) protocol, an Integrated Drive Electronics (IDE) protocol, a Firewire protocol, etc.

The memory controller 506 and the one or more non-volatile memory devices 504 can be integrated into various types of storage apparatuses, for example, be included in the same package, such as a Universal Flash Storage (UFS) package or an eMMC package. That is, the memory system 502 can be implemented and packaged into different types of end electronic products.

Figure 8:
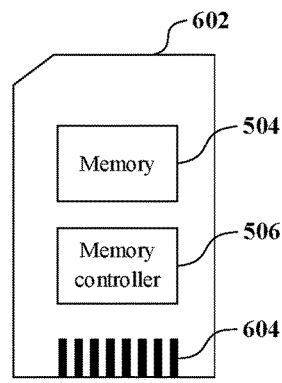
FIG. 8 is a schematic diagram of an example memory card having a memory system according to examples of the present application.

In one example as shown in FIG. 8, the memory controller 506 and a single non-volatile memory device 504 may be integrated into a memory card 602. The memory card 602 may include a PC card (PCMCIA, Personal Computer Memory Card International Association), a CF card, a Smart Media (SM) card, a memory stick, a Multimedia card (MMC, RS-MMC, MMCmicro), an SD card (SD, miniSD, microSD, SDHC), a UFS, etc. The memory card 602 may further comprise a memory card connector 604 coupling the memory card 602 with a host (e.g., the host 508 in FIG. 7).

Figure 9:
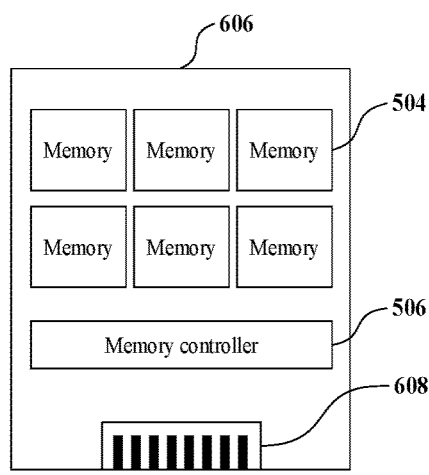
FIG. 9 is a schematic diagram of an example solid-state drive having a memory system according to examples of the present application.

In another example as shown in FIG. 9, the memory controller 506 and multiple non-volatile memory devices 504 may be integrated into an SSD 606. The SSD 606 may further comprise an SSD connector 608 coupling the SSD 606 with a host (e.g., the host 508 in FIG. 7). In some implementations, the storage capacity and/or the operation speed of the SSD 606 are greater than the storage capacity and/or the operation speed of the memory card 602 (as shown in FIG. 8).

According to a first aspect of the present application, examples of the present application provide a memory system comprising: a non-volatile memory device; a power supply circuit coupled with the non-volatile memory device and configured to provide power after power-down occurs; and a memory controller coupled with the non-volatile memory device and the power supply circuit and configured to: write data into the non-volatile memory device in response to a current predictive power supply duration of the power supply circuit being less than a predictive writing duration of writing the data into the non-volatile memory device, wherein the data comprises data to be written into the non-volatile memory device after the power-down occurs and before power supply of the power supply circuit ends.

According to a second aspect of the present application, examples of the present application provide an operation method of a memory system, comprising: determining that a current predictive power supply duration of a power supply circuit of the memory system is less than a predictive writing duration of writing data into a non-volatile memory device of the memory system, wherein the data comprises data to be written into the non-volatile memory device after power-down occurs and before power supply of the power supply circuit ends; and writing the data into the non-volatile memory device in response to the current predictive power supply duration of the power supply circuit being less than the predictive writing duration of writing the data into the non-volatile memory device.

According to a third aspect of the present application, examples of the present application provide a memory system, comprising: a non-volatile memory device, a capacitor and a memory controller, wherein the capacitor is coupled with the non-volatile memory device and the memory controller; and the memory controller is connected with the non-volatile memory device and configured to: control whether to trigger a data writing task currently according to a current capacity of the capacitor in conjunction with the number of input/output ports of the memory controller and the non-volatile memory device that transmit data currently and a data volume of the data, wherein the data comprises data to be written into the non-volatile memory device after power-down occurs and before power supply of the capacitor ends.

The features disclosed in several method or device examples as provided by the present application may be combined freely to obtain new method or device examples in case of no conflicts.

Those of ordinary skill in the art may understand that the above implementations are particular examples for implementing the present application, and in practical applications, various changes may be in form and in detail without departing from the spirit and scope of the present application. Within the technical scope disclosed by the present application, any person skilled in the art may readily conceive that variations or replacements should be encompassed within the protection scope of the present application.

What is claimed is:

1. A memory system, comprising:
    a non-volatile memory device;
    a power supply circuit coupled with the non-volatile memory device and configured to provide power after power-down occurs, wherein the power supply circuit further includes a capacitor; and
    a memory controller coupled with the non-volatile memory device and the power supply circuit and configured to:
        obtain a number of corresponding input/output ports for data transmission in a plurality of load states respectively and a number of input/output ports currently used for data transmission;
        obtain a proportion of load states of current input/output ports with respect to corresponding load states in the plurality of load states respectively based on the number of the corresponding input/output ports for data transmission in the plurality of load states respectively and the number of the input/output ports currently used for data transmission;
        obtain a current predictive power supply duration of the power supply circuit in the plurality of load states respectively based on a current capacity of the capacitor, corresponding power consumption of the non-volatile memory device and the memory controller in the plurality of load states respectively, and the proportion of the load states of the current input/output ports in the plurality of load states; and
        write data into the non-volatile memory device in response to the current predictive power supply duration of the power supply circuit being less than a predictive writing duration of writing the data into the non-volatile memory device, wherein the data comprises data to be written into the non-volatile memory device after the power-down occurs and before power supply of the power supply circuit ends.

2. The memory system of claim 1, wherein the memory controller is configured to:
    obtain a data volume of the data;
    obtain corresponding writing speeds of writing data into the non-volatile memory device in the plurality of load states respectively; and
    obtain corresponding predictive writing durations of writing the data into the non-volatile memory device in the plurality of load states respectively according to the data volume of the data and the corresponding writing speeds of writing the data into the non-volatile memory device in the plurality of load states.

3. The memory system of claim 2, wherein the memory controller is configured to:
    compare the current predictive power supply duration of the power supply circuit with the predictive writing duration of writing the data into the non-volatile memory device in the plurality of load states respectively; and
    write the data into the non-volatile memory device when the current predictive power supply duration is less than the predictive writing duration in any of the load states.

4. The memory system of claim 3, wherein the memory controller comprises:
    a plurality of comparators corresponding to the plurality of load states, wherein each of the plurality of comparators is configured to:
        compare the current predictive power supply duration with the predictive writing duration in one corresponding load state; and
        output a comparison result; and
    an OR gate coupled with each of the plurality of comparators, wherein the OR gate is configured to obtain a sign signal for characterizing comparison results in the plurality of load states based on the comparison result output by each of the plurality of comparators, wherein the sign signal is configured to indicate whether to write the data into the memory device currently.

5. The memory system of claim 1, wherein the plurality of load states comprise a Max Load state, an Idle Load state, and a Normal Load state, wherein a load corresponding to the Normal Load state is between a load corresponding to the Max Load state and a load corresponding to the Idle Load state.

6. The memory system of claim 1, wherein
    the memory controller is configured to:
        obtain the current capacity of the capacitor;
        obtain current power consumption of the non-volatile memory device and the memory controller; and
        obtain the current predictive power supply duration of the power supply circuit according to the current capacity and the current power consumption.

7. The memory system of claim 6, wherein the memory controller is configured to:
    obtain a data volume of the data;
    obtain a writing speed of writing current data into the non-volatile memory device; and
    obtain the predictive writing duration of storing the data into the non-volatile memory device according to the data volume of the data and the writing speed of writing the current data into the non-volatile memory device.

8. The memory system of claim 1, wherein the memory controller is configured to:

periodically obtain a predictive power supply duration of the power supply circuit and the predictive writing duration of storing the data into the non-volatile memory device; and adjust a period of obtaining the predictive power supply duration of the power supply circuit and the predictive writing duration of storing the data into the non-volatile memory device according to a difference between the predictive writing duration of storing the data into the non-volatile memory device and the predictive power supply duration of the power supply circuit.

9. The memory system of claim 1, wherein the memory controller comprises a volatile memory configured to store the data.

10. An operation method of a memory system, comprising:
obtaining a number of corresponding input/output ports for data transmission in a plurality of load states respectively and a number of input/output ports currently used for data transmission;
obtaining a proportion of load states of current input/output ports with respect to corresponding load states in the plurality of load states respectively based on the number of the corresponding input/output ports for data transmission in the plurality of load states respectively and the number of the input/output ports currently used for data transmission;
obtaining a current predictive power supply duration of a power supply circuit in the plurality of load states respectively based on a current capacity of a capacitor included in the power supply circuit, corresponding power consumption of a non-volatile memory device and a memory controller in the plurality of load states respectively, and the proportion of the load states of the current input/output ports in the plurality of load states, wherein the power supply circuit is coupled with the non-volatile memory device and is configured to provide power after power-down occurs; and
writing data into the non-volatile memory device in response to the current predictive power supply duration of the power supply circuit being less than a predictive writing duration of writing the data into the non-volatile memory device, wherein the data comprises data to be written into the non-volatile memory device after the power-down occurs and before power supply of the power supply circuit ends.

11. The operation method of claim 10, further comprising obtaining the predictive writing duration of storing the data into the non-volatile memory device, wherein obtaining the predictive writing duration of storing the data into the non-volatile memory device comprises:
obtaining a data volume of the data;
obtaining corresponding writing speeds of writing the data into the non-volatile memory device in the plurality of load states respectively; and
obtaining corresponding predictive writing durations of writing the data into the non-volatile memory device in the plurality of load states respectively according to the data volume of the data and the corresponding writing speeds of writing the data into the non-volatile memory device in the plurality of load states respectively.

12. The operation method of claim 11, wherein being in response to the current predictive power supply duration of the power supply circuit being less than the predictive writing duration of storing the data into the non-volatile memory device comprises:

comparing the current predictive power supply duration of the power supply circuit with the predictive writing duration of writing the data into the non-volatile memory device in the plurality of load states respectively; and
writing the data into the non-volatile memory device when the current predictive power supply duration is less than the predictive writing duration in any of the load states.

13. The operation method of claim 10, wherein the obtaining the current predictive power supply duration of the power supply circuit comprises:
obtaining the current capacity of the capacitor of the power supply circuit;
obtaining current power consumption of the non-volatile memory device and the memory controller; and
obtaining the current predictive power supply duration of the power supply circuit according to the current capacity and the current power consumption.

14. The operation method of claim 13, further comprising obtaining the predictive writing duration of storing the data into the non-volatile memory device, wherein the obtaining the predictive writing duration of storing the data into the non-volatile memory device comprises:
obtaining a data volume of the data;
obtaining a writing speed of writing current data into the non-volatile memory device; and
obtaining the predictive writing duration of storing the data into the non-volatile memory device according to the data volume of the data and the writing speed of writing the current data into the non-volatile memory device.

15. The operation method of claim 10, further comprising:
periodically obtaining a predictive power supply duration of the power supply circuit and the predictive writing duration of storing the data into the non-volatile memory device; and
adjusting a period of obtaining the predictive power supply duration of the power supply circuit and the predictive writing duration of storing the data into the non-volatile memory device according to a difference between the predictive writing duration of storing the data into the non-volatile memory device and the predictive power supply duration of the power supply circuit.

16. A memory system, comprising:
a non-volatile memory device,
a capacitor, and
a memory controller, wherein
the capacitor is coupled with the non-volatile memory device and the memory controller; and
the memory controller is connected with the non-volatile memory device and configured to:
obtain a number of corresponding input/output ports for data transmission in a plurality of load states respectively and a number of input/output ports currently used for data transmission;
obtain a proportion of load states of current input/output ports with respect to corresponding load states in the plurality of load states respectively based on the number of the corresponding input/output ports for data transmission in the plurality of load states respectively and the number of the input/output ports currently used for data transmission;
obtain a current predictive power supply duration of a power supply circuit in the plurality of load states respectively based on a current capacity of the capacitor, corresponding power consumption of the non-volatile memory device and the memory controller in the plurality of load states respectively, and the proportion of the load states of the current input/output ports in the plurality of load states; and control whether to trigger a data writing task currently according to the current capacity of the capacitor in conjunction with the number of input/output ports of the memory controller and the non-volatile memory device that transmit data currently and a data volume of the data, wherein the data comprises data to be written into the non-volatile memory device after power-down occurs and before power supply of the capacitor ends.

17. The memory system of claim 16, wherein the memory controller is configured to:
    obtain the data volume of the data;
    obtain corresponding writing speeds of writing data into the non-volatile memory device in the plurality of load states respectively; and
    obtain corresponding predictive writing durations of writing the data into the non-volatile memory device in the plurality of load states respectively according to the data volume of the data and the corresponding writing speeds of writing the data into the non-volatile memory device in the plurality of load states.

18. The memory system of claim 17, wherein the memory controller is configured to:
    compare the current predictive power supply duration of the power supply circuit with the predictive writing duration of writing the data into the non-volatile memory device in the plurality of load states respectively; and
    write the data into the non-volatile memory device when the current predictive power supply duration is less than the predictive writing duration in any of the load states.

19. The memory system of claim 18, wherein the memory controller comprises:
    a plurality of comparators corresponding to the plurality of load states, wherein each of the plurality of comparators is configured to:
        compare the current predictive power supply duration with the predictive writing duration in one corresponding load state; and
        output a comparison result; and
    an OR gate coupled with each of the plurality of comparators, wherein the OR gate is configured to obtain a sign signal for characterizing comparison results in the plurality of load states based on the comparison result output by each of the plurality of comparators, wherein the sign signal is configured to indicate whether to write the data into the memory device currently.

20. The memory system of claim 16, wherein the plurality of load states comprise a Max Load state, an Idle Load state, and a Normal Load state, wherein a load corresponding to the Normal Load state is between a load corresponding to the Max Load state and a load corresponding to the Idle Load state.

* * * * *